(12) United States Patent
Takahashi et al.

(10) Patent No.: US 12,341,187 B2
(45) Date of Patent: Jun. 24, 2025

(54) NON-AQUEOUS ELECTROLYTE SECONDARY BATTERY

(71) Applicant: Panasonic Corporation, Kadoma (JP)

(72) Inventors: Keiichi Takahashi, Hyogo (JP); Fumiharu Niina, Hyogo (JP); Natsumi Goto, Hyogo (JP); Takashi Ko, Osaka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 565 days.

(21) Appl. No.: 17/763,080

(22) PCT Filed: Aug. 28, 2020

(86) PCT No.: PCT/JP2020/032531
§ 371 (c)(1),
(2) Date: Mar. 23, 2022

(87) PCT Pub. No.: WO2021/059857
PCT Pub. Date: Apr. 1, 2021

(65) Prior Publication Data
US 2022/0367852 A1    Nov. 17, 2022

(30) Foreign Application Priority Data
Sep. 27, 2019    (JP) ................. 2019-176730

(51) Int. Cl.
*H01M 4/36*    (2006.01)
*H01M 4/02*    (2006.01)
(Continued)

(52) U.S. Cl.
CPC .......... *H01M 4/364* (2013.01); *H01M 4/366* (2013.01); *H01M 4/505* (2013.01); *H01M 4/525* (2013.01);
(Continued)

(58) Field of Classification Search
CPC ...... H01M 4/364; H01M 4/366; H01M 4/505; H01M 4/525; H01M 10/0525; H01M 2004/021; H01M 2004/028
See application file for complete search history.

(56) References Cited

U.S. PATENT DOCUMENTS

2017/0373352 A1* 12/2017 Saka ................. H01M 10/0525
2018/0131006 A1    5/2018 Kokubu et al.
(Continued)

FOREIGN PATENT DOCUMENTS

JP    2006-54159 A    2/2006
JP    2010-40382 A    2/2010
(Continued)

OTHER PUBLICATIONS

International Search Report dated Oct. 20, 2020, issued in counterpart International Application No. PCT/JP2020/032531, with English Translation. (5 pages).

Primary Examiner — Matthew T Martin
Assistant Examiner — Taylor Harrison Krone
(74) Attorney, Agent, or Firm — WHDA, LLP

(57) ABSTRACT

A nonaqueous electrolyte secondary battery comprises a positive electrode that contains, as positive electrode active materials: (A) a lithium transition metal composite oxide that has a volume-based D50 of 0.6 μm to 3 μm and that consists of secondary particles comprising aggregated primary particles with an average particle diameter of 0.5 μm or more or is configured of substantially one kind of particle; and (B) a lithium transition metal composite oxide that has a volume-based D50 of 6 μm to 25 μm and that consists of secondary particles, comprising aggregated primary particles with an average particle diameter of 0.3 μm or less.

5 Claims, 2 Drawing Sheets

(51) Int. Cl.
*H01M 4/505* (2010.01)
*H01M 4/525* (2010.01)
*H01M 10/0525* (2010.01)

(52) U.S. Cl.
CPC .. *H01M 10/0525* (2013.01); *H01M 2004/021* (2013.01); *H01M 2004/028* (2013.01)

(56) References Cited

U.S. PATENT DOCUMENTS

| | | |
|---|---|---|
| 2018/0261835 A1 | 9/2018 | Ogata et al. |
| 2019/0165360 A1 | 5/2019 | Saruwatari et al. |
| 2019/0173085 A1* | 6/2019 | Sugimori ............... H01M 4/525 |
| 2020/0266438 A1* | 8/2020 | Han ...................... H01M 4/366 |
| 2020/0358094 A1* | 11/2020 | Oshita .................... C01B 35/04 |

FOREIGN PATENT DOCUMENTS

| | | | | |
|---|---|---|---|---|
| JP | 2019-33016 A | 2/2019 | | |
| WO | 2017/056364 A1 | 4/2017 | | |
| WO | 2017/098679 A1 | 6/2017 | | |
| WO | WO-2017094237 A1 * | 6/2017 | ........ | H01M 10/0525 |
| WO | 2017/199891 A1 | 11/2017 | | |
| WO | WO-2019039567 A1 * | 2/2019 | ............ | C01B 35/04 |

\* cited by examiner

NON-AQUEOUS ELECTROLYTE SECONDARY BATTERY

CROSS-REFERENCE TO RELATED APPLICATIONS

This application is a national stage of International Application No. PCT/JP2020/032531, filed Aug. 28, 2020, which claims priority to Japanese Patent Application No. 2019-176730 filed Sep. 27, 2019 both of which are hereby incorporated by reference in their entirety.

TECHNICAL FIELD

The present disclosure generally relates to a non-aqueous electrolyte secondary battery.

BACKGROUND ART

In recent years, a lithium-transition metal composite oxide with a high Ni content has attracted attention as a positive electrode active material with a high energy density. Patent Literature 1, for example, discloses a non-aqueous electrolyte secondary battery including a composite oxide, as a positive electrode active material, formed of single crystal primary particles mainly composed of Ni and Li, represented by the general formula $Li_xNi_{1-p-q-r}Co_pAl_qA_rO_{2-y}$ (A represents at least one element selected from the group consisting of Ti, V, In, Cr, Fe, Sn, Cu, Zn, Mn, Mg, Ga, Ni, Co, Zr, Bi, Ge, Nb, Ta, Be, Ca, Sr, Ba, and Sc), and having an average particle diameter of 2 µm to 8 µm. Patent Literature 1 describes characteristics of the positive electrode active material as a low reactivity with an electrolyte liquid, a low internal resistance with using as a battery, and a resistance to pressure during a formation of the positive electrode.

Patent Literature 2 discloses a positive electrode active material in which a boron oxide covers a particle surface. Patent Literature 2 describes that using this positive electrode active material inhibits a side reaction between the active material and an electrolyte liquid, resulting in inhibition of gas generation inside the battery.

CITATION LIST

Patent Literature

PATENT LITERATURE 1: JP 2006-54159 A
PATENT LITERATURE 2: JP 2010-40382 A

SUMMARY

Non-aqueous electrolyte secondary batteries such as lithium ion batteries may cause particle cracking of a positive electrode active material associated with charging and discharging to increase the resistance, leading to lowered battery capacity. In particular, a cracking of larger particles constituted of many primary particles isolates many primary particles from a conductive path to increase a resistance increase rate. Such a cycle deterioration is more obvious with a higher battery temperature during charge and discharge.

A boron compound present on a particle surface of the positive electrode active material is expected to inhibit a side reaction between the active material and an electrolyte to improve a resistance maintenance rate in a cycle at high temperature, but the boron compound is presumed to become a resistant layer, leading to deteriorated rate characteristics.

An object of the present disclosure is to improve cycle characteristics at high temperature of a non-aqueous electrolyte secondary battery with high capacity including a lithium-transition metal composite oxide with a high Ni content as a positive electrode active material without impairing other battery characteristics.

A non-aqueous electrolyte secondary battery of an aspect of the present disclosure comprises: a positive electrode including a positive electrode active material; a negative electrode; and a non-aqueous electrolyte, wherein the positive electrode includes: a lithium-transition metal composite oxide (A) having a median diameter on a volumetric basis (D50) of 0.6 µm to 3 µm and being a secondary particle formed by aggregation of primary particles having an average particle diameter of 0.5 µm or larger or being composed of substantially single particles; and a lithium-transition metal composite oxide (B) having a median diameter on a volumetric basis (D50) of 6 µm to 25 µm and being a secondary particle formed by aggregation of primary particles having an average particle diameter of 0.3 µm or smaller, as the positive electrode active material; the lithium-transition metal composite oxide (A) contains 65 mol % or more of Ni based on a total number of moles of metal elements excluding Li; and the lithium-transition metal composite oxide (B) contains 70 mol % or more of Ni based on a total number of moles of metal elements excluding Li, and boron is present on a particle surface of the oxide. In the lithium-transition metal composite oxide (B), when particles having a particle diameter larger than a 70% particle diameter (D70) on a volumetric basis are defined as first particles, and particles having a particle diameter smaller than a 30% particle diameter (D30) on a volumetric basis are defined as second particles, a mole fraction of boron based on a total number of moles of metal elements excluding Li in the first particles (B1) is larger than a mole fraction of boron based on a total number of moles of metal elements excluding Li in the second particles (B2).

The non-aqueous electrolyte secondary battery according to the present disclosure has excellent cycle characteristics at high temperature. The non-aqueous electrolyte secondary battery also has a high energy density and good other battery characteristics such as rate characteristics.

DESCRIPTION OF EMBODIMENTS

The present inventors have made intensive investigation to solve the above problem, and as a result, have successfully achieved both of the high energy density and the excellent cycle characteristics at high temperature by using lithium-transition metal composite oxides (A) and (B) in combination and, in the composite oxide (B), by setting a mole fraction of boron contained in first particles having a larger particle diameter to be larger than a mole fraction of boron contained in second particles having a smaller particle diameter. It is considered that the composite oxide (A), which has a smooth particle surface, relaxes a pressure during a rolling of a positive electrode mixture layer and a stress due to a change in volume of the mixture layer during charge and discharge, and the mixture layer may be efficiently filled with each composite oxide. Therefore, cracking of the composite oxide particles may be inhibited, and a density of the mixture layer may be increased.

A higher content of boron, which inhibits the side reaction with the electrolyte, in the first particles that are larger particles having a large impact on particle cracking may further inhibit a cracking of the first particles. Meanwhile, setting an amount of boron contained in the second particles that are smaller particles to be smaller than that in the first particles may achieve good rate characteristics. It is considered that the non-aqueous electrolyte secondary battery according to the present disclosure has succeeded in achieving high energy density and excellent cycle characteristics at high temperature by a synergistic effect between the relaxation effect of the composite oxide (A) and the change in the amount of boron added according to the particle diameter of the composite oxide (B).

Hereinafter, an example of an embodiment of a non-aqueous electrolyte secondary battery according to the present disclosure will be described in detail. Hereinafter, a cylindrical battery in which a wound electrode assembly 14 is housed in a bottomed cylindrical exterior housing can 16 will be exemplified, but an exterior housing body is not limited to a cylindrical exterior housing can and may be, for example, a rectangular exterior housing can and may be an exterior housing body constituted of laminated sheets including a metal layer and a resin layer. The electrode assembly may be a stacked electrode assembly in which a plurality of positive electrodes and a plurality of negative electrodes are alternatively stacked with separators interposed therebetween.

Figure 1:
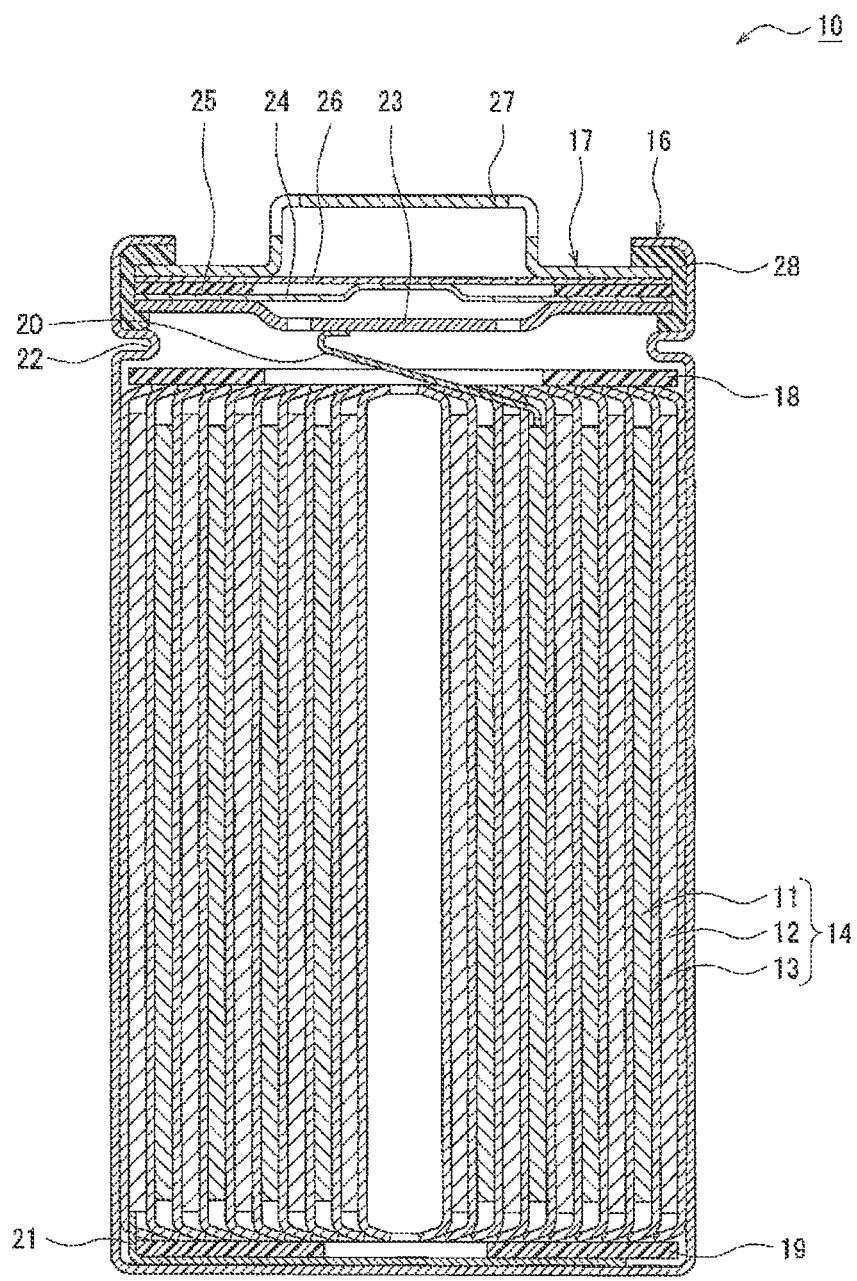
FIG. 1 is a sectional view of a non-aqueous electrolyte secondary battery of an example of an embodiment.

FIG. 1 is a sectional view of a non-aqueous electrolyte secondary battery 10 of an example of an embodiment. As exemplified in FIG. 1, the non-aqueous electrolyte secondary battery 10 comprises the wound electrode assembly 14, a non-aqueous electrolyte, and the exterior housing can 16 housing the electrode assembly 14 and the non-aqueous electrolyte. The electrode assembly 14 has a positive electrode 11, a negative electrode 12, and a separator 13, and has a wound structure in which the positive electrode 11 and the negative electrode 12 are spirally wound with the separator 13 interposed therebetween. The exterior housing can 16 is a bottomed cylindrical metallic container having an opening at one side in an axial direction, and the opening of the exterior housing can 16 is sealed with a sealing assembly 17. Hereinafter, for convenience of description, the sealing assembly 17 side of the battery will be described as the upper side, and the bottom side of the exterior housing can 16 will be described as the lower side.

The non-aqueous electrolyte includes a non-aqueous solvent and an electrolyte salt dissolved in the non-aqueous solvent. For the non-aqueous solvent, esters, ethers, nitriles, amides, a mixed solvent of two or more thereof, and the like are used, for example. The non-aqueous solvent may contain a halogen-substituted solvent in which at least some hydrogens in these solvents are substituted with halogen atoms such as fluorine. For the electrolyte salt, a lithium salt such as $LiPF_6$ is used, for example. The electrolyte is not limited to a liquid electrolyte, and may be a solid electrolyte using a gel polymer or the like.

Any of the positive electrode 11, negative electrode 12, and separator 13 constituting the electrode assembly 14 is a band-shaped elongated body, and spirally wound to be alternatively stacked in a radial direction of the electrode assembly 14. To prevent precipitation of lithium, the negative electrode 12 is formed to be one size larger than the positive electrode 11. That is, the negative electrode 12 is formed to be longer than the positive electrode 11 in a longitudinal direction and a width direction (short direction). Two separators 13 are formed to be one size larger than at least the positive electrode 11, and disposed to, for example, sandwich the positive electrode 11. The electrode assembly 14 has a positive electrode lead 20 connected to the positive electrode 11 by welding or the like and a negative electrode lead 21 connected to the negative electrode 12 by welding or the like.

Insulating plates 18 and 19 are disposed on the upper and lower sides of the electrode assembly 14, respectively. In the example illustrated in FIG. 1, the positive electrode lead 20 extends through a through hole in the insulating plate 18 toward a side of the sealing assembly 17, and the negative electrode lead 21 extends through an outside of the insulating plate 19 toward the bottom side of the exterior housing can 16. The positive electrode lead 20 is connected to a lower surface of an internal terminal plate 23 of the sealing assembly 17 by welding or the like, and a cap 27, which is a top plate of the sealing assembly 17 electrically connected to the internal terminal plate 23, becomes a positive electrode terminal. The negative electrode lead 21 is connected to a bottom inner surface of the exterior housing can 16 by welding or the like, and the exterior housing can 16 becomes a negative electrode terminal.

A gasket 28 is provided between the exterior housing can 16 and the sealing assembly 17 to achieve sealability inside the battery. On the exterior housing can 16, a grooved part 22 in which a part of a side part thereof projects inside for supporting the sealing assembly 17 is formed. The grooved part 22 is preferably formed in a circular shape along a circumferential direction of the exterior housing can 16, and supports the sealing assembly 17 with the upper surface thereof. The sealing assembly 17 is fixed on the upper part of the exterior housing can 16 with the grooved part 22 and with an end part of the opening of the exterior housing can 16 calked to the sealing assembly 17.

The sealing assembly 17 has a stacked structure of the internal terminal plate 23, a lower vent member 24, an insulating member 25, an upper vent member 26, and the cap 27 in this order from the electrode assembly 14 side. Each member constituting the sealing assembly 17 has, for example, a disk shape or a ring shape, and each member except for the insulating member 25 is electrically connected each other. The lower vent member 24 and the upper vent member 26 are connected at each of central parts thereof, and the insulating member 25 is interposed between each of the circumferential parts of the vent members 24 and 26. If the internal pressure of the battery increases due to abnormal heat generation, the lower vent member 24 is deformed so as to push the upper vent member 26 up toward the cap 27 side and breaks, and thereby a current pathway between the lower vent member 24 and the upper vent member 26 is cut off. If the internal pressure further increases, the upper vent member 26 breaks, and gas is discharged through the cap 27 opening.

Hereinafter, the positive electrode 11, negative electrode 12, and separator 13, which constitute the electrode assembly 14, particularly the positive electrode active material constituting the positive electrode 11, will be described in detail.

[Positive Electrode]

Figure 2:
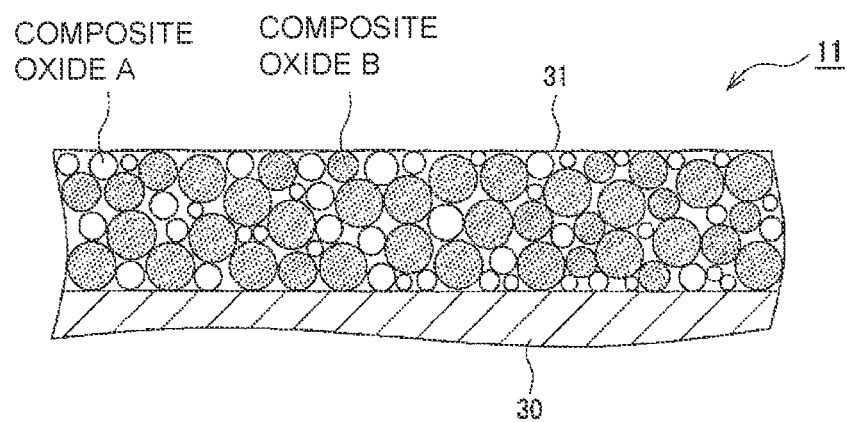
FIG. 2 is a sectional view of a positive electrode of an example of an embodiment.

FIG. 2 is a view illustrating a part of a cross section of the positive electrode 11. As exemplified in FIG. 2, the positive electrode 11 has a positive electrode core 30 and a positive electrode mixture layer 31 provided on a surface of the positive electrode core 30. For the positive electrode core 30, a foil of a metal stable within a potential range of the positive electrode 11, such as aluminum, a film in which such a metal is disposed on a surface layer thereof, and the like may be used. The positive electrode mixture layer 31 includes a positive electrode active material, a binder, and a conductive agent, and is preferably provided on both surfaces of the positive electrode core 30 except for a portion to which the positive electrode lead 20 is connected. The positive electrode 11 may be produced by, for example, applying a positive electrode mixture slurry including the positive electrode active material, the binder, the conductive agent, and the like on the surface of the positive electrode core 30, drying and subsequently compressing the applied film to form the positive electrode mixture layers 31 on both the surfaces of the positive electrode core 30.

Examples of the conductive agent included in the positive electrode mixture layer 31 may include a carbon material such as carbon black, acetylene black, Ketjenblack, and graphite. Examples of the binder included in the positive electrode mixture layer 31 may include a fluororesin such as polytetrafluoroethylene (PTFE) and polyvinylidene fluoride (PVdF), polyacrylonitrile (PAN), a polyimide, an acrylic resin, and a polyolefin. With these resins, a cellulose derivative such as carboxymethyl cellulose (CMC) or a salt thereof, polyethylene oxide (PEO), and the like may be used in combination.

The positive electrode 11 includes a lithium-transition metal composite oxide (A) having a median diameter (D50) on a volumetric basis of 0.6 μm to 3 μm and a lithium-transition metal composite oxide (B) having D50 of 6 μm to 25 μm, as the positive electrode active material (hereinafter, the lithium-transition metal composite oxides (A) and (B) are simply referred to as "composite oxides (A) and (B)"). The positive electrode active material of the present embodiment includes only the composite oxides (A) and (B), but the positive electrode mixture layer 31 may include a composite oxide other than the composite oxides (A) and (B) or another compound within a range in which an object of the present disclosure is not impaired.

The median diameter (D50) on a volumetric basis, also referred to as a median diameter, means a particle diameter at which a cumulative frequency is 50% from a smaller particle diameter side in a particle size distribution on a volumetric basis. The particle diameter and particle size distribution of the composite oxide may be measured by using a laser diffraction-type particle size distribution measuring device (for example, MT3000II, manufactured by MicrotracBEL Corp.) with water as a dispersion medium.

The composite oxide (A) is a composite oxide particle being a secondary particle formed by aggregation of primary particles having a large average particle diameter of 0.5 μm or larger or being composed of substantially single particles. The composite oxide (A) composed of substantially single particles means particles in which no particle boundary of the primary particles is observed by using a scanning electron microscope (SEM) with an appropriate magnification. When the composite oxide (A) is a secondary particle, an average particle diameter of the primary particles is 0.5 μm to 3 μm. The composite oxide (B) is a secondary particle formed by aggregation of primary particles having a small average particle diameter of, for example, 0.3 μm or smaller.

When the composite oxide (A) is a secondary particle, a particle boundary of the primary particles is observed on the particle cross section observed with a SEM. The composite oxide (A) is, for example, composed of 100 or less, several to tens of, or, for example, 2 to 5 primary particles, and the composite oxide (B) is composed of 10000 to 5000000 primary particles. Particle diameters of the primary particles are measured as Feret's diameter of a region surrounded by the particle boundary (primary particle) on a SEM image of the particle cross section of the composite oxide. The average particle diameter of the primary particles is calculated by averaging particle diameters of 100 primary particles.

The composite oxide (A) contains 65 mol % or more of Ni based on the total number of moles of metal elements excluding Li. The composite oxide (B) contains 70 mol % or more of Ni based on the total number of moles of metal elements excluding Li. A battery having a high energy density may be obtained by using a positive electrode active material with a high Ni content rate. The Ni content rate in the composite oxide (A) may be lower than the Ni content rate in the composite oxide (B). Boron is present on at least a particle surface of the composite oxide (B).

The composite oxides (A) and (B) may contain a meal element other than Li, Ni, and B. Example of the metal element may include Co, Mn, Al, Ti, Zr, Mg, Fe, Cu, Zn, Sn, Na, K, Ba, Sr, Ca, W, Mo, Nb, and Si. Compositions of the composite oxides (A) and (B) may differ from each other. The composite oxide (A) may or may not contain boron. On the other hand, the composite oxide (B) contains boron, and boron is present at least on a particle surface of the composite oxide (B).

A preferable example of the composite oxide (A) is a composite oxide represented by the general formula $Li_aNi_bCo_cMn_dB_eO_f$ (in the formula, $0.8 \leq a \leq 1.2$, $b \geq 0.70$, $c \leq 0.10$, $0.03 \leq d \leq 0.12$, $0 \leq e \leq 0.05$, $1 \leq f \leq 2$ and $b+c+d+e=1$). The mole fraction of the metal elements in an entirety of the particles of the composite oxide is measured by inductively coupled plasma (ICP) atomic emission spectroscopic analysis.

The particle surface of the composite oxide (A) is smoother than the particle surface of the composite oxide (B). The sphericity of the composite oxide (A) is not particularly limited, but preferably 0.7 or more and 0.9 or less. The sphericity may be calculated with the following formula from a particle image taken with irradiating a sample flow including particles of the composite oxide with stroboscopic light.

Sphericity=(Circumference Length of Circle having Area Same as Particle Image)/(Circumference Length of Particle Image)

The compressive strength of the composite oxide (A) may be, for example, 250 MPa or higher or 350 MPa or higher. In this case, the particle cracking due to charge and discharge is inhibited, resulting in contribution to improvement in the cycle characteristics at high temperature comparing with a case not satisfying the above range. An upper limit of the compressive strength of the composite oxide (A) is not limited, and, for example, 1500 MPa or lower. The compressive strength of the composite oxide (A) is measured with a method specified in JIS-R1639-5.

The composite oxide (A) may be produced by, for example, the following procedure.

First, a lithium compound such as lithium hydroxide and an oxide containing nickel and the above exemplified metal elements are mixed at a mixing ratio based on the composite oxide (A) of interest. At this time, a potassium compound is further added into the mixture. Then, the mixture containing the lithium compound, the oxide containing nickel and the metal elements, and the potassium compound or sodium compound is calcinated in the atmosphere or in an oxygen flow. Thereafter, the obtained calcinated product is washed with water to remove a potassium compound or sodium compound adhered to a surface of the calcinated product.

The composite oxide (A) is synthesized with the above method. A detailed theory of the enlargement of the particle diameter of the primary particles is not clear, but it is presumed that adding a potassium compound into the above mixture uniformly proceeds a growth of the single crystal particle in an entirety of the mixture phase during the calcination.

A calcinating temperature in the above step is, for example, 600° C. to 1050° C., and higher temperature tends to enlarge the primary particles. A calcinating time is approximately 1 to 100 hours when the calcination temperature is 600 to 1050° C. The composite oxide (A) may also be obtained by a crystal growth with an oxide having a low melting point such as Na and K, provided that the flux compound is removed by washing with water or the like. Examples of the potassium compound include a potassium hydroxide (KOH) and a salt thereof and potassium acetate. The potassium compound is added at an amount of, for example, 0.1 to 100 mass % or less based on the composite oxide (A) to be synthesized.

The composite oxide (B) contains boron, as above. Boron may be present on surface of the secondary particle of the composite oxide (B), and may also be present on surfaces of the primary particles. A part of boron may also be present inside the primary particles to form a solid solution with another metal element contained in the composite oxide (B). A large amount of boron is preferably present on the surface of the secondary particle from the viewpoint of inhibition of the side reaction between the active material and the electrolyte.

A preferable example of the composite oxide (B) is a composite oxide represented by the general formula $Li_aNi_bCo_cMn_dB_eO_f$ (in the formula, $0.8 \leq a \leq 1.2$, $b \geq 0.70$, $c \leq 0.10$, $0.03 \leq d \leq 0.12$, $0 \leq e \leq 0.05$, $1 \leq f \leq 2$ and $b+c+d+e=1$). A content rate (number of moles) of boron in the composite oxide (B) based on a total number of moles of metal elements excluding Li is preferably 0.1 to 5 mol %, and more preferably 0.2 to 2 mol %. An amount of boron within the above range may efficiently inhibit the particle cracking.

In the composite oxide (B), when particles having a particle diameter larger than a 70% particle diameter (D70) on a volumetric basis are defined as first particles, and particles having a particle diameter smaller than a 30% particle diameter (D30) on a volumetric basis are defined as second particles, a mole fraction of boron based on the total number of moles of metal elements excluding Li in the first particles (B1) is larger than a mole fraction of boron based on the total number of moles of metal elements excluding Li in the second particles (B2). Amounts of boron contained in the first particles and the second particles are measured by ICP, similar to other metal elements.

That is, the composite oxide (B) is particles having a ratio (B1/B2) of the mole fraction of boron contained in the first particles (B1) to the mole fraction of boron contained in the second particles (B2), of 1 or more. Using such a composite oxide (B) may efficiently inhibit the side reaction with the electrolyte to result in obtaining a battery having a high energy density and excellent cycle characteristics at high temperature by a synergistic effect with the composite oxide (A).

The D70 means a particle diameter at which a cumulative frequency is 70% from a smaller particle diameter side in a particle size distribution on a volumetric basis. Similarly, the D30 means a particle diameter at which the cumulative frequency is 30% from the smaller particle diameter side in the particle size distribution on a volumetric basis. For example, the D70 is 9 µm to 19 µm, and the D30 is 3 µm to 13 µm.

The ratio (B1/B2) of the mole fraction of boron contained in the first particles (B1) to the mole fraction of boron contained in the second particles (B2) is preferably 1.1 or more, more preferably 1.5 or more, and may be 3.0 or more. An upper limit of (B1/B2) is not particularly limited, and for example, being 10. A preferable example of a range of (B1/B2) is 1.5 to 3.5 or 2.5 to 3.5.

As long as the mole fractions of boron (B1) and (B2) measured by ICP satisfy the condition of (B1)>(B2), the first particles may contain particles having a mole fraction of boron (B1) being the same as or smaller than the mole fraction of boron in the second particles (B2). The second particles may contain particles having a mole fraction of boron (B2) being larger than the mole fraction of boron on the particle surfaces of the first particles (B1). (B2) is preferably larger than 0, and boron is present on both surfaces of the first particles and the second particles.

In the composite oxide (B), boron is typically present in a state of a boron compound. The boron compound may contain Li. For a boron source, a boron compound such as boric acid ($H_3BO_3$), boron oxide ($B_2O_3$), and lithium borate ($LiBO_2$ or $Li_2B_4O_7$) is used, as described below. When used as the boron source, boric acid or boron oxide may react with Li present on the particle surface during calcination to generate the boron compound containing Li and B.

The boron compound may be formed in a layered state for coating the particle surface (surface of the secondary particles) of the composite oxide (B), or may be scatteringly present on the particle surfaces, but the boron compound preferably does not completely cover an entirety of the particle surface. That is, there is a region where no boron compound is adhered on the particle surface of the composite oxide (B). When the boron compound is present as particles, a particle diameter of the boron compound is typically smaller than the particle diameter of the primary particles constituting the composite oxide (B). The boron compound particles may be observed with an SEM. The boron compound is preferably adhered in a wide range without uneven distribution on a part of the particle surface of the composite oxide (B).

A thickness of the boron compound on the particle surface of the composite oxide (B) is preferably 100 nm or less, and more preferably 50 nm or less. The thickness of the boron compound is more preferably 10 nm or more. A preferable example of the thickness of the boron compound is 10 nm to 50 nm. The thickness of the boron compound within the above range may efficiently improve the cycle characteristics at high temperature without impairing the rate characteristics and the like.

A coverage of each of the surfaces of the first particles and the second particles with boron (hereinafter, which may be referred to as "surface coverage") is preferably 99% or less, more preferably 90% or less, and particularly preferably 70% or less. This case may efficiently improve the cycle characteristics at high temperature without impairing the rate characteristics of the battery and the like. A surface coverage of 100% means covering an entirety of the particle surface with the boron compound. That is, when the surface coverage is less than 100%, there is a region where no boron compound is adhered on the particle surface. A lower limit of the surface coverage with boron is, for example, 50%.

The surface coverage with boron is measured by electron probe micro analyzer (EPMA) or X-ray photoelectron spectroscopy analysis (XPS). In EPMA, the surface coverage with boron is determined with a ratio of a peak area of boron to a total peak area of metal elements excluding Li. In XPS, the surface coverage with boron is calculated with a mole fraction of boron based on a total number of moles of metal elements excluding Li (when the mole fraction of boron is 1, the surface coverage becomes 100%). XPS identifies elements on the particle surface. The XPS measurement is performed by setting a spot diameter of the X-ray irradiation to be 1 mmφ or larger and in a state where each of the first particles and the second particles are selected and disposed in the irradiation spot. In this case, since hundreds of particles are included in the irradiation spot, the mole fraction of boron is measured as an average value of a plurality of particles.

The composite oxide (B) may be produced by, for example, the following procedure.

First, into each of two nickel compounds (X1) and (X2) having different D50s and containing at least Ni and containing no Li nor B, a lithium source such as lithium hydroxide is added, and the mixtures are calcinated to synthesize lithium-nickel composite oxides (Y1) and (Y2) having different D50s (step 1). An example of composite compounds is a composite oxide or hydroxide containing Ni, Co, and Mn. At this time, one lithium-nickel composite oxide may be classified to obtain two lithium-nickel composite oxides having different D50s. For the classification, conventionally known methods may be used. The obtained lithium-nickel composite oxides (Y1) and (Y2) may be washed with water. Washing with water reduces not only the amounts of Li present on the particle surfaces of the composite oxides but also the amounts of Li present inside the particle, resulting in generation of a space inside the washed composite oxide particles with water.

Next, a boron source is added into each of the lithium-nickel composite oxides (Y1) and (Y2) to form composites of boron on the particle surfaces, and then the composite oxides are calcinated to synthesize lithium-transition metal composite oxides (Z1) and (Z2) (step 2). Thereafter, the composite oxides (Z1) and (Z2) are mixed to obtain the composite oxide (B). An example of the boron sources is boric acid ($H_3BO_3$). For forming composites, a dry particle composing machine (for example, NOB-130, manufactured by HOSOKAWA MICRON CORPORATION) or the like is used. At this time, a lithium source such as lithium hydroxide may be added in addition to the boron source.

In the step 2, setting the amount of $H_3BO_3$ to be added to the lithium-nickel composite oxide (Y1) to be larger than the amount of $H_3BO_3$ to be added to the lithium-nickel composite oxide (Y2) may achieve a state of the mole fraction (B1)>the mole fraction (B2) of boron on surfaces of the first particles and the second particles of the composite oxide (B). A calcinating temperature in the step 2 is, for example, 200° C. to 500° C.

Of the composite oxides (Y1) and (Y2), with or without washing with water and adjusting the calcinating temperature may adjust the covering amounts and thicknesses of the boron compound on the surfaces of the first particles and the second particles of the composite oxide (B). Calcinating the washed composite oxides (Y1) and (Y2) with water with the boron source at a high temperature may synthesize composite oxides having lower surface covering amounts of the boron compound. Even with washed composite oxide (Y1) and (Y2) with water, calcinating at a low temperature prevents boron from entering the space inside the particles, resulting in the surface covering amount and the thickness of the boron compound being substantially the same as in a case without washing with water. The high temperature is referred to, for example, 350° C. to 500° C., and the low temperature is referred to, for example, 200° C. to 325° C.

As described above, the positive electrode active material is a mixture of the composite oxide (A) and the composite oxide (B). A content rate of the composite oxide (A) based on a mass of the positive electrode active material is, for example, 5 to 65 mass %, preferably 10 to 60 mass %, and particularly preferably 20 to 55 mass %. A content rate of the composite oxide (B) based on a mass of the positive electrode active material is, for example, 35 to 95 mass %, preferably 40 to 90 mass %, and particularly preferably 45 to 80 mass %.

A density of the positive electrode mixture layer 31 is preferably 3.55 g/cc or higher, and more preferably 3.60 g/cc or higher. The mixing ratio of the composite oxides (A) and (B) within the above range may improve a filling property of the particles to increase a filling density of the positive electrode mixture layer 31, and a battery having a high energy density and excellent a cycle characteristics at high temperature may be obtained.

[Negative Electrode]

The negative electrode 12 has a negative electrode core and a negative electrode mixture layer provided on a surface of the negative electrode core. For the negative electrode core, a foil of a metal stable within a potential range of the negative electrode 12, such as copper, a film in which such a metal is disposed on a surface layer thereof, and the like may be used. The negative electrode mixture layer includes a negative electrode active material and a binder, and is preferably provided on, for example, both surfaces of the negative electrode core except for a portion to which the negative electrode lead 21 is connected. The negative electrode 12 may be produced by, for example, applying a negative electrode mixture slurry including the negative electrode active material, the binder, and the like on the surface of the negative electrode core, drying and subsequently compressing the applied film to form the negative electrode mixture layers on both the surfaces of the negative electrode core.

The negative electrode mixture layer includes, for example, a carbon-based active material to reversibly occlude and release lithium ions, as the negative electrode active material. The carbon-based active material is preferably a graphite such as: a natural graphite such as flake graphite, massive graphite, and amorphous graphite; and an artificial graphite such as massive artificial graphite (MAG) and graphitized mesophase-carbon microbead (MCMB). For the negative electrode active material, a Si-based active material composed of at least one of Si and a Si-containing compound may also be used, and the carbon-based active material and the Si-based active material may be used in combination.

For the binder included in the negative electrode mixture layer, a fluororesin, PAN, a polyimide, an acrylic resin, a polyolefin, and the like may be used similar to that in the positive electrode 11, but styrene-butadiene rubber (SBR) is preferably used. The negative electrode mixture layer preferably further includes CMC or a salt thereof, polyacrylic acid (PAA) or a salt thereof, polyvinyl alcohol (PVA), and the like. Among them, SBR; and CMC or a salt thereof, or PAA or a salt thereof are preferably used in combination.

[Separator]

For the separator 13, a porous sheet having an ion permeation property and an insulation property is used. Specific examples of the porous sheet include a fine porous thin film, a woven fabric, and a nonwoven fabric. As a material for the separator 13, a polyolefin such as polyethylene and polypropylene, cellulose, and the like are preferable. The separator 13 may have any of a single-layered structure and a multilayered structure. On a surface of the separator, a heat-resistant layer and the like may be formed.

EXAMPLES

Hereinafter, the present disclosure will be further described with Examples, but the present disclosure is not limited to these Examples.

Example 1

[Production of Composite Oxide A]

A nickel-cobalt-manganese composite hydroxide having D50 of 15 μm with a composition of $Ni_{0.80}Co_{0.10}Mn_{0.10}(OH)_2$ obtained by coprecipitation was calcinated at 500° C. to obtain a nickel-cobalt-manganese composite oxide. Then, a lithium hydroxide and the produced nickel-cobalt-manganese composite oxide were mixed so that a molar ratio between Li and the total amount of Ni, Co, and Mn was 1.05:1, and then a potassium compound was added into this mixture at a rate of 20 mass % based on the composite oxide. This mixture was calcinated in an oxygen atmosphere at 750° C. for 72 hours, then crushed, and washed with water for removing the potassium compound to obtain a composite oxide A.

ICP analysis demonstrated that the composite oxide A had a composition of $Li_{1.01}Ni_{0.80}Co_{0.10}Mn_{0.10}O_2$. A value of D50 of the composite oxide A was 2.3 μm. A cross section of the composite oxide A after a CP processing was observed with an SEM, and as a result, an average primary particle diameter of the composite oxide A was 1.4 μm. In the composite oxide A, approximately 95% or more of all the particles had a single particle structure, and some particles had a pseudo aggregating structure in which 3 to 10 or more primary particles were bonded.

[Production of Composite Oxide B]

A nickel-cobalt-manganese composite hydroxide with a composition of $Ni_{0.85}Co_{0.08}Mn_{0.07}(OH)_2$ obtained by coprecipitation was calcinated at 500° C. and then sieved by using a vibrating sieve device (sieve opening of 300 μm, vibration time of 30 min.) to obtain a nickel-cobalt-manganese composite oxide having a larger particle diameter (X1), which remained on the sieve and had D50 of 14 μm, and a nickel-cobalt-manganese composite oxide having a smaller particle diameter (X2), which passed through the sieve and had D50 of 7 μm.

Then, a lithium hydroxide and the nickel-cobalt-manganese composite oxide having a larger particle diameter (X1) were mixed so that a molar ratio between Li and the total amount of Ni, Co, and Mn was 1.08:1. This mixture was calcinated in an oxygen atmosphere at 700° C. for 8 hours, and then crushed to obtain a lithium composite oxide having a larger particle diameter (Y1).

A lithium hydroxide and the nickel-cobalt-manganese composite oxide having a smaller particle diameter (X2) were mixed so that a molar ratio between Li and the total amount of Ni, Co, and Mn was 1.08:1. This mixture was calcinated in an oxygen atmosphere at 700° C. for 8 hours, and then crushed to obtain a lithium composite oxide having a smaller particle diameter (Y2).

Next, the lithium composite oxide having a larger particle diameter (Y1) and a boric acid ($H_3BO_3$) were dry-mixed so that a molar ratio between the total amount of Ni, Co, and Mn, and B in $H_3BO_3$ was 100:1.5 to form a composite of boron on the particle surface. This mixture was calcinated in an oxygen atmosphere at 300° C. for 8 hours, and then crushed to obtain a lithium composite oxide having a larger particle diameter in which boron was present at least on the particle surface (Z1).

Next, the lithium composite oxide having a smaller particle diameter (Y2) and $H_3BO_3$ were dry-mixed so that a molar ratio between the total amount of Ni, Co, and Mn, and B in $H_3BO_3$ was 100:0.5 to form a composite of boron on the particle surface. This mixture was calcinated in an oxygen atmosphere at 300° C. for 8 hours, and then crushed to obtain a lithium composite oxide having a smaller particle diameter in which boron was present at least on the particle surface (Z2).

The lithium composite oxides (Z1) and (Z2) were mixed at a mass ratio of 1:1 to be a composite oxide (B), and the lithium composite oxide A was further mixed therewith to be an amount at 50 mass % based on the total mass of a positive electrode active material to be the positive electrode active material.

In the composite oxide (B), a mole fraction of boron in the first particles having a particle diameter larger than D70 on a volumetric basis (B1) was 0.015, a mole fraction of boron on the surface of the second particles having a particle diameter smaller than D30 on a volumetric basis (B2) was 0.005, and the ratio (B1/B2) was 3.0. A coverage of each of the surfaces of the first particles and the second particles with boron was 96%. The amounts of boron (mole fractions) contained in the first particles and the second particles are measured by ICP, as above. The amount of boron present on the particle surface (surface coverage) is measured by EPMA.

ICP analysis demonstrated that the composite oxide B had a composition of $Li_{1.01}Ni_{0.85}Co_{0.08}Mn_{0.07}B_{0.01}O_2$. In a particle size distribution of the composite oxide B, the D50 was 11 μm, the D70 was 14 μm, and the D30 was 7.5 μm. A cross section of the composite oxide B after a CP processing was observed with an SEM, and as a result, an average primary particle diameter of the composite oxide B was 0.15 μm.

[Production of Positive Electrode]

The above positive electrode active material, acetylene black, and polyvinylidene fluoride (PVdF) were mixed at a solid-content mass ratio of 96.3:2.5:1.2, an appropriate amount of N-methyl-2-pyrrolidone (NMP) was added, and then the mixture was kneaded to prepare a positive electrode mixture slurry. This positive electrode mixture slurry was applied on both surfaces of a positive electrode core made of aluminum foil, the applied film was dried, and then rolled using a roller and cut to a predetermined electrode size to obtain a positive electrode in which the positive electrode mixture layer was formed on both the surfaces of the positive electrode core. An exposed part where a surface of the positive electrode core was exposed was provided at a part of the positive electrode.

[Production of Negative Electrode]

Natural graphite was used as the negative electrode active material. The negative electrode active material, carboxymethyl cellulose sodium salt (CMC-Na), and styrene-butadiene rubber (SBR) were mixed at a solid-content mass ratio of 100:1:1 in an aqueous solution to prepare a negative electrode mixture slurry. This negative electrode mixture slurry was applied on both surfaces of a negative electrode core made of copper foil, the applied film was dried, and then rolled using a roller and cut to a predetermined electrode size to obtain a negative electrode in which the negative electrode mixture layer was formed on both the surfaces of the negative electrode core. An exposed part where a surface of the negative electrode core was exposed was provided at a part of the negative electrode.

[Preparation of Non-Aqueous Electrolyte]

Into a mixed solvent of ethylene carbonate (EC), ethyl methyl carbonate (EMC), and dimethyl carbonate (DMC) at a volume ratio of 3:3:4, lithium hexafluorophosphate (LiPF$_6$) was dissolved at a concentration of 1.0 mol/litter. Vinylene carbonate (VC) was further dissolved into the above mixed solvent at a concentration of 2.0 mass % to prepare a non-aqueous electrolyte liquid.

[Production of Battery]

An aluminum lead was attached to the exposed part of the positive electrode, a nickel lead was attached to the exposed part of the negative electrode, the positive electrode and the negative electrode were spirally wound with a separator made of polyolefin interposed therebetween, and then press-formed in the radial direction to produce a flat, wound electrode assembly. This electrode assembly was housed in an exterior housing body composed of an aluminum laminated sheet, the above non-aqueous electrolyte liquid was injected thereinto, and then an opening of the exterior housing body was sealed to obtain a non-aqueous electrolyte secondary battery having a designed capacity of 650 mAh.

Example 2

A positive electrode active material and a non-aqueous electrolyte secondary battery were produced in the same manner as in Example 1 except that the calcinating temperatures during the synthesis of the lithium composite oxides (Z1) and (Z2) were changed to 400° C. in the production of the composite oxide B.

Comparative Example 1

A positive electrode active material and a non-aqueous electrolyte secondary battery were produced in the same manner as in Example 1 except that no composite oxide A was used (100% composite oxide B).

Comparative Example 2

A positive electrode active material and a non-aqueous electrolyte secondary battery were produced in the same manner as in Example 2 except that no composite oxide A was used (100% composite oxide B).

Comparative Example 3

A non-aqueous electrolyte secondary battery was produced in the same manner as in Example 1 except that: no composite oxide A was used (100% composite oxide B); no sieving was performed during the synthesis of the composite oxide B; and the obtained lithium composite oxide and boric acid (H$_3$BO$_3$) were dry-mixed so that a molar ratio between the total amount of Ni, Co, and Mn, and B in H$_3$BO$_3$ was 100:1.

Comparative Example 4

A non-aqueous electrolyte secondary battery was produced in the same manner as in Example 2 except that: no composite oxide A was used (100% composite oxide B); no sieving was performed during the synthesis of the composite oxide B; and the obtained lithium composite oxide and boric acid (H$_3$BO$_3$) were dry-mixed so that a molar ratio between the total amount of Ni, Co, and Mn, and B in H$_3$BO$_3$ was 100:1.

[Cycle Test at High Temperature]

Each of the batteries of Examples and Comparative Examples was charged at a constant current of 0.5 It until a battery voltage reached 4.2 V under a temperature environment of 60° C., and charged at a constant voltage of 4.2 V until a current value reached 1/50 It. Then, the test cell was discharged at a constant current of 0.5 It until the battery voltage reached 2.5 V. This charge-discharge cycle was repeated 150 times.

[Evaluation of Capacity Maintenance Rate after Cycle Test]

On each of the batteries of Examples and Comparative Examples, a discharge capacity at the 1st cycle and discharge capacity at the 150th cycle in the cycle test were determined, and the capacity maintenance rate was calculated with the following formula.

Capacity Maintenance Rate(%)=(Discharge Capacity at 150th Cycle/Discharge Capacity at 1st Cycle)×100

[Evaluation of Filling Property of Positive Electrode Mixture Layer]

On each of the positive electrodes produced in Examples and Comparative Examples, a 1-m, strip-shaped electrode plate for filling property evaluation (thickness of 200 μm) in which the mixture layer was formed on both surfaces was produced. This electrode plate was compressed using a rolling machine having a roller diameter of 750 mm (manufactured by Xingtai Naknor Technology Co., Ltd.) with changing a compressive condition (gap value), and after the compression, punched with a diameter of 40 mm. Table 1 shows a filling density of each electrode plate under a compressive condition under which an elongation of the electrode plate was 1%. In Table 1, a high filling density of the positive electrode mixture layer is shown as ○ (a particularly high filling density is shown as ⊙), and a low filling density is shown as × (a particularly low filling density is shown as ××).

TABLE 1

| | | Composite oxide B | | | | Evaluation | |
| | | First particle | | Second particle | | Filling property | Cycle capacity |
| | Composite oxide A (%) | Boron content (mol %) | Surface covering rate of boron (%) | Boron content (mol %) | Surface covering rate of boron (%) | of active material particle (—) | maintenance rate (%) |
|---|---|---|---|---|---|---|---|
| Example 1 | 50 | 1.5 | 96 | 0.5 | 96 | ○ | 94.4 |
| Example 2 | 50 | 1.5 | 60 | 0.5 | 60 | ⊙ | 92.3 |
| Comparative Example 1 | — | 1.5 | 96 | 0.5 | 96 | X | 86.6 |
| Comparative Example 2 | — | 1.5 | 60 | 0.5 | 60 | X | 84.2 |

TABLE 1-continued

| | Composite oxide A (%) | Composite oxide B | | | | Evaluation | |
| --- | --- | --- | --- | --- | --- | --- | --- |
| | | First particle | | Second particle | | Filling property of active material particle (—) | Cycle capacity maintenance rate (%) |
| | | Boron content (mol %) | Surface covering rate of boron (%) | Boron content (mol %) | Surface covering rate of boron (%) | | |
| Comparative Example 3 | — | 1.0 | 96 | 1.0 | 96 | XX | 74.8 |
| Comparative Example 4 | — | 1.0 | 60 | 1.0 | 60 | X | 72.1 |

As shown in Table 1, any of the batteries of Examples has a higher capacity maintenance rate after the cycle test than the batteries of Comparative Examples, and has excellent cycle characteristics at high temperature.

REFERENCE SIGNS LIST

10 Non-aqueous electrolyte secondary battery
11 Positive electrode
12 Negative electrode
13 Separator
14 Electrode assembly
16 Exterior housing can
17 Sealing assembly
18, 19 Insulating plate
20 Positive electrode lead
21 Negative electrode lead
22 Grooved part
23 Internal terminal plate
24 Lower vent member
25 Insulating member
26 Upper vent member
27 Cap
28 Gasket
30 Positive electrode core
31 Positive electrode mixture layer

The invention claimed is:

1. A non-aqueous electrolyte secondary battery, comprising:
a positive electrode including a positive electrode active material;
a negative electrode; and
a non-aqueous electrolyte, wherein
the positive electrode includes: a lithium-transition metal composite oxide (A) having a median diameter on a volumetric basis (D50) of 0.6 μm to 3 μm and being a secondary particle formed by aggregation of primary particles having an average particle diameter of 0.5 μm or larger or being composed of single particles; and a lithium-transition metal composite oxide (B) having a median diameter on a volumetric basis (D50) of 6 μm to 25 μm and being a secondary particle formed by aggregation of primary particles having an average particle diameter of 0.3 μm or smaller, as the positive electrode active material;
the lithium-transition metal composite oxide (A) contains 65 mol % or more of Ni based on a total number of moles of metal elements excluding Li;
the lithium-transition metal composite oxide (B) contains 70 mol % or more of Ni based on a total number of moles of metal elements excluding Li, and boron is present at least on a particle surface of the oxide; and
in the lithium-transition metal composite oxide (B), when particles having a particle diameter larger than a 70% particle diameter (D70) on a volumetric basis are defined as first particles, and particles having a particle diameter smaller than a 30% particle diameter (D30) on a volumetric basis are defined as second particles,
a mole fraction of boron based on a total number of moles of metal elements excluding Li in the first particles (B1) is larger than a mole fraction of boron based on a total number of moles of metal elements excluding Li in the second particles (B2).

2. The non-aqueous electrolyte secondary battery according to claim 1, wherein a content rate of the lithium-transition metal composite oxide (A) based on a mass of the positive electrode active material is 20 to 55 mass %.

3. The non-aqueous electrolyte secondary battery according to claim 1, wherein a coverage of each of surfaces of the first particles and the second particles with boron is 70% or less.

4. The non-aqueous electrolyte secondary battery according to claim 1, wherein the lithium-transition metal composite oxide (A) is a composite oxide represented by the general formula $Li_aNi_bCo_cMn_dB_eO_f$, wherein $0.8 \leq a \leq 1.2$, $b \geq 0.70$, $c \leq 0.10$, $0.03 \leq d \leq 0.12$, $0.001 \leq e \leq 0.05$, $1 \leq f \leq 2$, and $b+c+d+e=1$.

5. The non-aqueous electrolyte secondary battery according to claim 1, wherein the lithium-transition metal composite oxide (B) is a composite oxide represented by the general formula $Li_aNi_bCo_cMn_dB_eO_f$, wherein $0.8 \leq a \leq 1.2$, $b \geq 0.70$, $c \leq 0.10$, $0.03 \leq d \leq 0.12$, $0.001 \leq e \leq 0.05$, $1 \leq f \leq 2$, and $b+c+d+e=1$.

* * * * *